(12) United States Patent
Muschkalski

(10) Patent No.: US 8,023,142 B2
(45) Date of Patent: Sep. 20, 2011

(54) SYSTEM, METHOD AND PROGRAM PRODUCT FOR ELECTRONICALLY FILING DOCUMENTS

(75) Inventor: Thomas Muschkalski, Oberkraemer (DE)

(73) Assignee: International Business Machines Corporation, Armonk, NY (US)

( * ) Notice: Subject to any disclaimer, the term of this patent is extended or adjusted under 35 U.S.C. 154(b) by 1777 days.

(21) Appl. No.: 11/155,236

(22) Filed: Jun. 17, 2005

(65) Prior Publication Data

US 2006/0012818 A1    Jan. 19, 2006

(30) Foreign Application Priority Data

Jul. 13, 2004   (EP) .................... 04103348

(51) Int. Cl.
 *G06F 3/12* (2006.01)
 *G06F 15/173* (2006.01)
 *G06K 15/00* (2006.01)
 *G06K 15/02* (2006.01)
 *H04N 1/60* (2006.01)

(52) U.S. Cl. ........ 358/1.16; 358/1.15; 358/1.2; 358/1.9; 708/223

(58) Field of Classification Search ................. 358/1.16, 358/1.15, 1.9, 1.2; 709/223, 219, 202
See application file for complete search history.

(56) References Cited

U.S. PATENT DOCUMENTS 6,515,756 B1 * 2/2003 Mastie et al. ................ 358/1.15

* cited by examiner

*Primary Examiner* — Thomas Lett
(74) *Attorney, Agent, or Firm* — Arthur J. Samodovitz

(57) ABSTRACT

System, method and computer program product for managing a document. A printer driver of a computer outputs printing data corresponding to the document to an IP port of the computer. A program detects the printing data en route to or at the IP port and determines whether there exists, apart from the printing data, a file containing classification information for storing the printing data. If so, the program appends the classification information to the printing data and sends the printing data and appended classification information to a storage server for storage. The classification information specifies a format for storing the printing data. The program determines whether there exists a file containing classification information by searching for a file with a name which corresponds by convention to a name of the document represented by the printing data. The program appends the classification information to the printing data as comments.

20 Claims, 3 Drawing Sheets

SYSTEM, METHOD AND PROGRAM PRODUCT FOR ELECTRONICALLY FILING DOCUMENTS

FIELD OF THE INVENTION

The present invention relates generally to electronic filing of documents, and more particularly to archiving documents.

BACKGROUND OF THE INVENTION

It is known for a software application to generate and/or process a document and prepare the document for printing by a printer driver. The application may electronically file the document in a medium. Document management systems are also known to archive documents for long term retention for example in TIF- and PDF-image formats.

It is known to transform data for printing a document into a long-term archive format, and then use the transformed data for archiving. For example, International Patent Application WO 02/19086 describes such a method for archiving large data streams as generated and processed by the host computer of an electronic data processing center. According to the International Patent Application WO 02/19086, an enhanced spooling system which is part of the printer driver performs the archiving process as follows. The enhanced spooling system collects files to be printed, checks whether an incoming file should be archived, and if so, how the incoming file should be archived. If a file should be archived, the enhanced spooling system supplies the file data and the necessary archiving parameters to a program module to generate three data sets which are then transmitted to a storage system. Because the archiving method described in the International Patent Application WO 02/19086 uses an enhanced spooling system and a specially designed printer driver with an enhanced functionality, it may not work with client computers or workstations with standard user applications and a standard printer driver.

Accordingly, an object of the present invention is to electronically file documents which applications have produced and a printer driver has prepared, without special enhancements to either the applications or printer driver.

SUMMARY OF THE INVENTION

The present invention resides in a system, method and computer program product for managing a document. A printer driver of a computer outputs printing data corresponding to the document to an IP port of the computer. A program detects the printing data en route to or at the IP port and determines whether there exists, apart from the printing data, a file containing classification information for storing the printing data. If so, the program appends the classification information to the printing data and sends the printing data and appended classification information to a storage server for storage. The classification information specifies a format for storing the printing data.

In accordance with features of the present invention, the program determines whether there exists a file containing classification information by searching for a file with a name which corresponds by convention to a name of the document represented by the printing data. The program appends the classification information to the printing data as comments. The program queries a user whether to append digital signature information to the printing data.

DETAILED DESCRIPTION OF THE PREFERRED EMBODIMENTS

Figure 1:
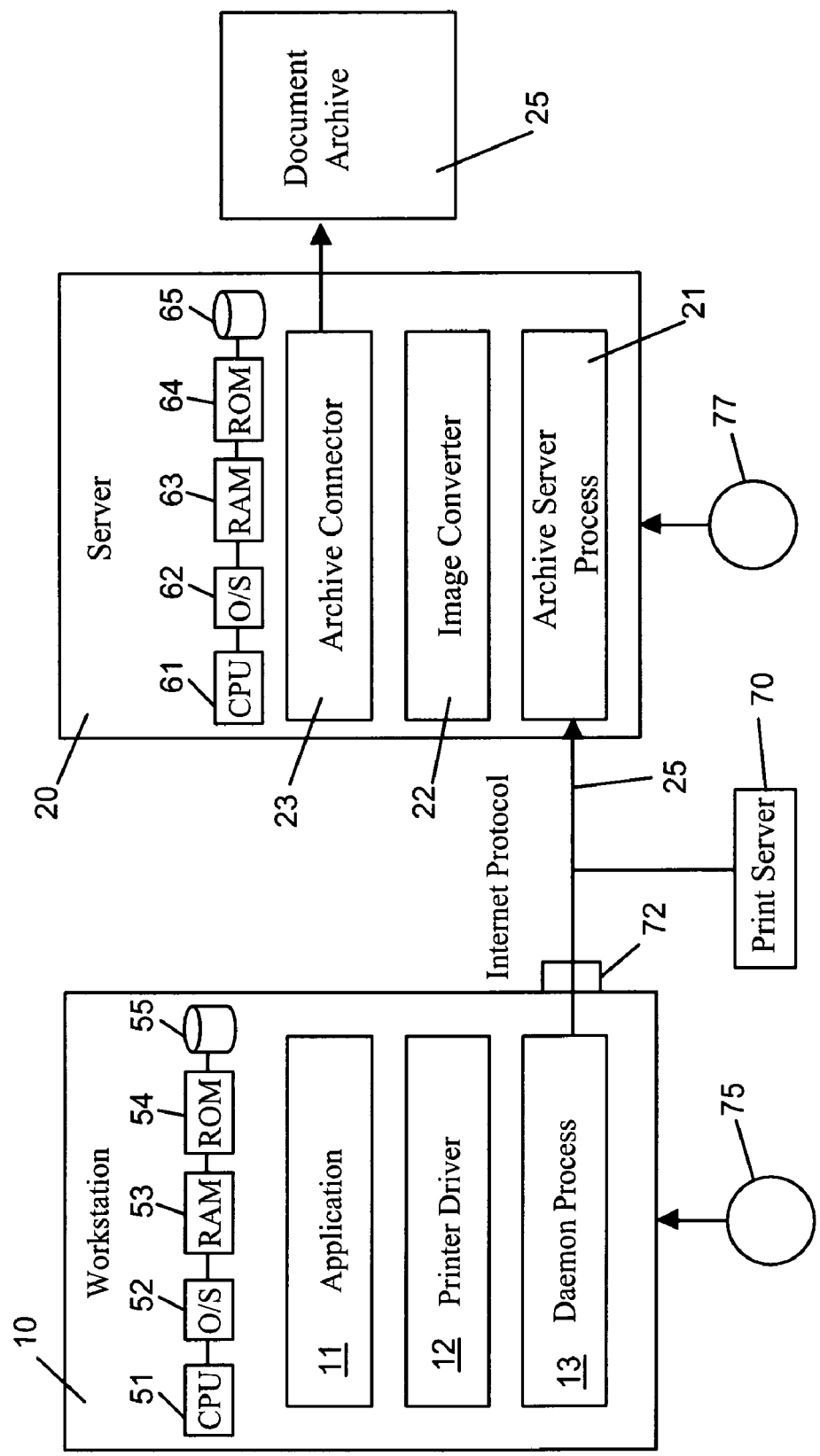
FIG. 1 is a block diagram of an infrastructure or distributed computer system according to the present invention.

FIG. 1 is a block diagram of an infrastructure or distributed computer system generally designated 8 for electronically archiving documents. Infrastructure 8 comprises a client computer 10 such as a workstation, an archive server 20 coupled to computer 10 via a network 25 such as the Internet, and a document archive storage 25.

Computer 10 comprises a standard CPU 51, operating system 52, RAM 53, ROM 54 and storage 55. Computer 10 also includes a known application 11 for generating and processing documents such as word processing, groupware, mail or CAD software. Application program 11 is stored on computer readable disk storage 55 for execution by CPU 51 via computer readable RAM 53. Computer 10 also includes a local printer driver 12, which may be configured as a postscript printer driver. The printer driver 12 receives print commands from the application 11. When receiving such a print command, the printer driver 12 generates printing data for the corresponding document to send to a print server 70. Printer driver program 12 is stored on computer readable disk storage 55 for execution by CPU 51 via computer readable RAM 53. A daemon program process 13, according to the present invention, surveys or reviews the printing data for a document output by the printer driver 12 to determine whether the document should be electronically archived. Daemon program process 13 is stored on computer readable disk storage 55 for execution by CPU 51 via computer readable RAM 53. Although the printer driver 12 and the daemon program 13 are located on computer 10 in the illustrated example, it is also possible to use an external printer driver and/or to locate the daemon program 13 on the print server.

The daemon program process 13 determines whether the printing data should be automatically archived, based on the presence of an XML format classification file corresponding to the document/printing data. If such a classification file exists for the document, then daemon program process 13 knows to store the printing data for the document. The daemon program process 13 searches for such a corresponding format classification file based on its name which, by convention, is similar to the name of the printing data file. Consequently, no changes are needed to the document or printing data generated by the application or printer driver to implement the present invention. If such a format classification file exists and is valid, the daemon process 13 reads the classification information from the file and appends the classification information as comments to the printing data. If the daemon process 13 cannot locate such a format classification file, the daemon process 13 can query the user whether the printing data should be stored, and if so, what format to use. The format classification information indicates the data format for archiving the printing data. The components and functionality of such a daemon process 13 will be described in more detail below with reference to FIGS. 2 and 3. The daemon process 13 sends the resultant data stream to the archive server 20. The archive server process 21 retrieves the classification information added by the daemon process 13 and supplies it to an image converter within archive server 20. In response, the image converter 22 transforms post script printing data of the document to be archived in a long-term image format according to the retrieved classification information.

The long-term image format can be TIF- or PDF-image formats. Then, an archive connector 23 within the server 20 stores the document, for example, the corresponding long-term image data, in the document archive storage 25. Archive connector program 23 is stored on a computer readable disk storage 65 for execution by a CPU 61 via a computer readable RAM 63. Image Converter program 22 is stored on computer readable disk storage 65 for execution by CPU 61 via computer readable RAM 63. Archive server program process 21 is stored on computer readable disk storage 65 for execution by CPU 61 via computer readable RAM 63.

Figure 2:
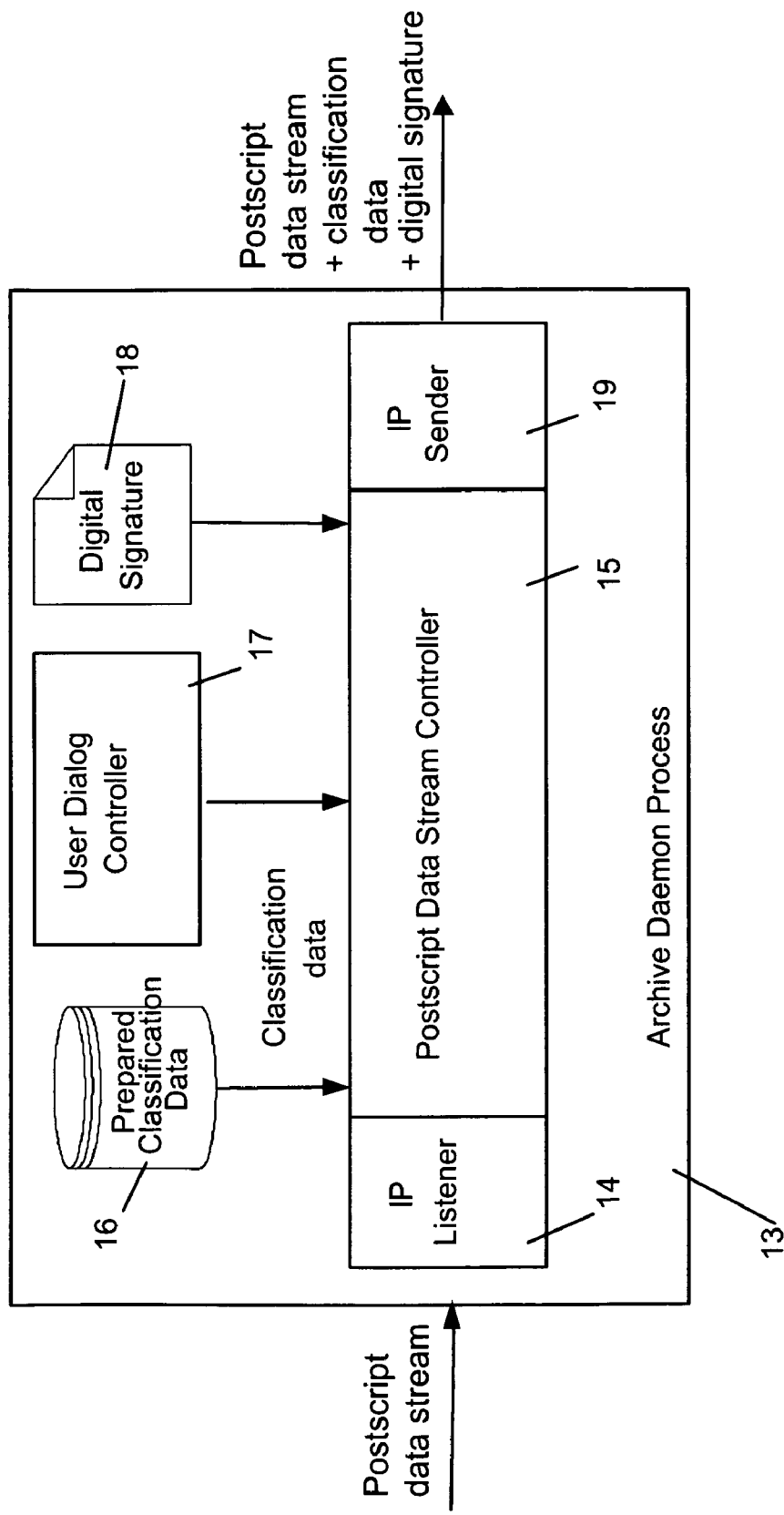
FIG. 2 is a block diagram of an archiving daemon program process according to the present invention.

FIG. 2 illustrates the configuration and functionality of one embodiment of the daemon program process 13. The printer driver 12 transmits the printing data it generates to the print server 70 via a local IP (Internet Protocol) port 72 of the printer driver 12. The daemon process 13 uses an IP listener program 14 to survey the local IP port 72 (or the printing data en route to the IP port 72) of the printer driver 12. Thus, the daemon process 13 reviews or surveys every printing data stream which is output via the local IP port 72 of the printer driver 12. A postscript data stream controller 15 implements the main functionality of the daemon process 13. First, the controller 15 determines whether the document corresponding to the surveyed printing data stream should be electronically archived. This determination is based on whether an XML format classification file exists (elsewhere) for the document in question. Another process created this format classification file with a defined XML format and stored it in a common directory 16. The classification file has a name which corresponds, by convention, with the name of the document represented by the printing data. By way of example, the format classification file has the same name as the corresponding document followed by an extension name. Consequently, the controller 15 can identify the corresponding classification file, if it exists. If a corresponding classification file exists for the document, the controller 15 recognizes that archiving is intended for the document, reads the classification information from the classification file, and appends the classification information to the corresponding printing data (for example, as comments), assuming the classification information is valid.

Figure 3:
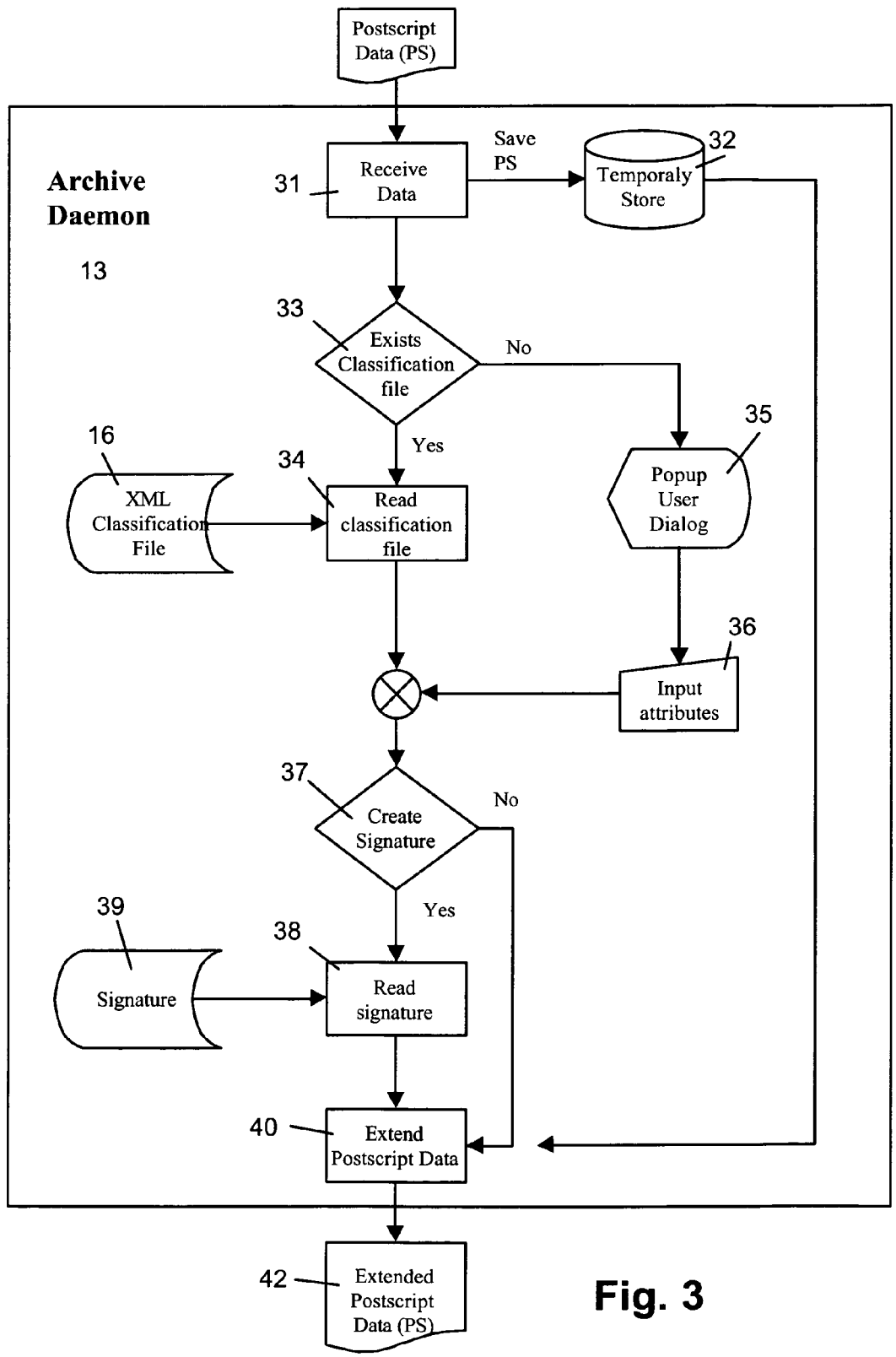
FIG. 3 is a detailed flow chart of the archiving daemon program process of FIG. 2.

FIG. 3 illustrates the function performed by the archive daemon program 13 in more detail. In step 31, the archive daemon program 13 surveys or reviews printing data output by the printer driver to an outbound IP port 72. In step 32, the archive daemon program 13 stores the printing data temporarily in storage 65 while (a) checking whether there is a format classification information file (elsewhere) which corresponds to the document represented by the printing data (step 33) and (b) reading the identified classification file, if found and valid (step 34). The printing data is temporarily stored in storage 65 because the printing data files for a document are often too large for the memory 63.

If controller 15 cannot find or access a classification file corresponding to the document represented by the printing data, either because such a file does not exist or the controller 15 does not have access to the file, or if the classification information is not valid, then the controller 15 will not know whether to store the printing data or in what format to store the printing data. In such a case, the controller 15 initiates a user dialogue by invoking a user dialogue controller 17. User dialogue controller 17 displays and handles a user dialogue to offer the user the option of archiving in addition to printing the document. If the user selects an option to archive the document, controller 17 asks the user for classification information, i.e. the desired data format for archiving. Depending on the configuration of the user dialogue, the user can also communicate further input attributes to be appended to the printing data as comments, for example archive information to identify the document archive in which the document should be stored. To implement the user dialogue, in step 35, the controller 17 displays a user dialogue and in step 36, the controller 17 retrieves the classification information and further input attributes given by the user.

Daemon program process 13 also includes a digital signature program 18 as illustrated in FIG. 2. Program 18 enables the user to select, via a user dialogue, that a digital signature of the user or creator of the document be appended to the printing data, as comments. Thus, the digital signature program 18 queries the user in step 37 whether the user wants to append the user's or document creator's digital signature to the printing data for the document. If so, the digital signature program 18 reads the user's digital signature (indexed by the user's userID) or creator's digital signature (indexed by the document name) from a signature file 39 in step 38, and appends the digital signature to the printing data as comments.

Referring again to FIG. 3, in step 40, the controller 15 merges the printing data temporarily stored in step 32, the classification data obtained in step 34 or 36, further input attributes, if any, obtained in step 36 and the signature data, if any, retrieved in step 38 (assuming all the data is valid). In step 42, the controller 15 extends the printing data received form the printer driver by all of the foregoing additional information. Step 42 shall be illustrated by an example where all additional information is added as comments to the printing data. The comments are "transparent" and will not be affected by subsequent processing of printing data, even transformation of the printing data into another data format for archiving. Nevertheless, the comments are part of the same data stream and stored file as the printing data. Next, the controller 15 transmits the resultant data stream to the archive server program process 21 within the archive server 20 via an IP sender module 19 of the daemon process 13. In the illustrated embodiment, the archive server program process 21 stores the signature data together with the document data in the document archive storage 25.

The following is an example of the foregoing processing. The daemon program process 13 surveys a postscript data stream output from printer driver 12. The postscript data stream begins with a header line:

%!PS-Adobe-3.0

The %-sign indicates a comment line, which will be ignored by later postscript processing and thus, will not have any affect on the target output format. The daemon program process 13 takes advantage of this feature and inserts the following classification data:

% CSOComments Start
   %<?xml version="1.0" encoding="UTF-8"?>
   %<cso:Classifer xmlns:cso=http://www.ibm.com/kcm/cso>
   <cso:Properties>
   % . . . .
   % CSOComments End marked as comment lines after the starting header line. Also, the daemon program process 13 marks the following signature information as comments:

% CSOSigning Start
   % Signer Information
   % CSOSigning End

The daemon program process 13 inserts the following signature information after the classification data. Consequently, the output data stream of step 40 is as follows:

```
%!PS-Adobe-3.0%
% CSOComments Start
%
%<?xml version="1.0" encoding="UTF-8"?>
%<cso:Classifer xmlns:cso=http://www.ibm.com/kcm/cso>
  <cso:Properties>
%....
%
% CSOComments End
% CSOSigning Start
% Signer Information
% CSOSigning End
%% Title: Word—Document_2004_04_08_13_37_08.doc
%% Creator: Pscript5.dll Version 5.2
....
```

The classification data as well as the inserted signature information are transparent to a postscript image converter process and are not affected by the postscript image conversion process. Nevertheless, the classification data and the signature information are part of the same data stream as the printing data. This kind of data merging supports synchronizing the following processing.

As already mentioned in connection with FIG. 1, the extended printing data is transmitted to an archive server 20, where the classification and signature information will be extracted and used to convert the post script data into an image format according to the classification information. The additional data, i.e. the classification data and the signature information, will not be part of the resultant image format data.

Thus, the daemon program process 13 and archive server cooperate to archive documents created by standard applications. Neither the standard applications nor standard printer drivers have to be modified to implement the present invention.

Daemon program process 13 can be loaded into workstation 10 from a computer readable medium such as a magnetic, optical or DVD disk 75 or downloaded via the Internet. Likewise, the archive server program process 21, image converter program 22 and archive connector program 23 can be loaded into server 20 from a computer readable medium such as a magnetic, optical or DVD disk 77 or downloaded via the Internet.

The invention claimed is:

1. A method for managing a document, a printer driver of a computer outputting printing data corresponding to the document to an IP port of the computer, the method comprising the steps of:
   the computer detecting the printing data en route to or at the IP port and determining whether there exists, apart from the printing data, a file containing classification information for storing the printing data, and if so,
      the computer appending the classification information to the printing data and sending the printing data and appended classification information to a storage server for storage, the classification information specifying a format for storing the printing data.

2. The method of claim 1 wherein the computer appends the classification information to the printing data as comments.

3. The method of claim 1 further comprising the step of the computer fetching the file and reading the classification information.

4. The method of claim 1 further comprising the steps of: the storage server transforming the printing data into the specified format, and the storage server storing the printing data in the specified format.

5. The method of claim 1 wherein the computer includes a daemon program process which performs the detecting, determining and appending steps.

6. The method of claim 1 wherein the computer includes a local IP listener program to detect and capture the printing data output by the printer driver to the IP port.

7. The method of claim 1 wherein the computer determines whether there exists a file containing classification information by searching for a file with a name which corresponds by convention to a name of the document represented by the printing data.

8. The method of claim 1 wherein the computer determines whether there exists a file containing classification information by searching for a file with a name which includes a name of the document and an extension to the name of the document.

9. The method of claim 1 wherein if there does not exist a file containing classification information for storing the printing data, further comprising the step of the computer querying a user whether the printing data should be stored, and if so, what format in which to store the printing data.

10. The method of claim 1 further comprising the steps of:
   the computer querying a user whether to append digital signature information to the printing data, and if so, the computer appending the digital signature information to the printing data and sending the printing data with the classification information and the digital signature information to the storage server.

11. The method of claim 10 wherein the digital signature information is appended as comments to the printing data.

12. The method of claim 1 wherein the format is a long-term data format, and the storage server archives the printing data.

13. The method of claim 1 further comprising the step of the computer appending information to the printing data as comments to identify a document archive in which to store the printing data.

14. A system for managing a document, a printer driver of a computer outputting printing data corresponding to the document to an IP port of the computer, the system comprising:
   a CPU, a computer readable memory and a computer readable storage device;
   first program instructions to detect the printing data en route to or at the IP port and determine whether there exists, apart from the printing data, a file containing classification information for storing the printing data; and
   second program instructions, responsive to a determination that the file exists, to append the classification information to the printing data and send the printing data and appended classification information to a storage server for storage, the classification information specifying a format for storing the printing data; and wherein
   the first and second program instructions are stored on the computer readable storage device for execution by the CPU via the computer readable memory.

15. The system of claim 14 wherein the second program instructions append the classification information to the printing data as comments.

16. The system of claim 14 further comprising:
   third program instructions, stored on a second computer readable storage device for execution by a second CPU via a second computer readable memory at the storage server, to transform the printing data into the specified format, and store the printing data in the specified format.

17. The system of claim 14 wherein the first program instructions determine whether the file exists by searching for a file with a name which corresponds by convention to a name of the document represented by the printing data.

18. The system of claim 14 wherein the first program instructions determine whether the file exists by searching for a file with a name which includes a name of the document and an extension to the name of the document.

19. A computer program product for managing a document, a printer driver of a computer outputting printing data corresponding to the document to an IP port of the computer, the computer program product comprising:

a tangible storage device;

first program instructions to detect the printing data en route to or at the IP port and determine whether there exists, apart from the printing data, a file containing classification information for storing the printing data; and second program instructions, responsive to a determination that the file exists, to append the classification information to the printing data and send the printing data and appended classification information to a storage server for storage, the classification information specifying a format for storing the printing data; and wherein the first and second program instructions are stored on the tangible storage device.

20. The computer program product of claim 19 wherein the first program instructions determine whether the file exists by searching for a file with a name which corresponds by convention to a name of the document represented by the printing data.

* * * * *